(12) United States Patent
Byler et al.

(10) Patent No.: US 7,760,195 B2
(45) Date of Patent: Jul. 20, 2010

(54) WRITING INSTRUMENT THAT CALCULATES GRADE

(75) Inventors: Rebecca Byler, Hendersonville, TN (US); Daniel Lee Bizzell, Davidson, NC (US); Ian D. Kovacevich, Charlotte, NC (US); Jerry Shew, Charlotte, NC (US); Paula Bestemer, Charlotte, NC (US)

(73) Assignee: Edison Nation, LLC, Charlotte, NC (US)

( * ) Notice: Subject to any disclaimer, the term of this patent is extended or adjusted under 35 U.S.C. 154(b) by 827 days.

(21) Appl. No.: 11/530,761

(22) Filed: Sep. 11, 2006

(65) Prior Publication Data

US 2008/0062152 A1 Mar. 13, 2008

(51) Int. Cl.
G06F 3/033 (2006.01)
(52) U.S. Cl. ...................... 345/179; 434/353
(58) Field of Classification Search ................ None
See application file for complete search history.

(56) References Cited

U.S. PATENT DOCUMENTS

| | | | |
|---|---|---|---|
| 3,254,836 A | 6/1966 | Corpian | |
| 3,617,708 A | 11/1971 | Bongiovanni | |
| 4,012,852 A * | 3/1977 | Journot et al. | 434/362 |
| 4,128,889 A * | 12/1978 | Ojima et al. | 708/107 |
| 4,158,285 A * | 6/1979 | Heinsen et al. | 708/111 |
| 4,404,643 A * | 9/1983 | Ojima et al. | 708/107 |
| 4,726,044 A | 2/1988 | Perna et al. | |
| 6,104,603 A * | 8/2000 | Wang | 361/679.09 |
| 6,130,666 A * | 10/2000 | Persidsky | 345/179 |
| 2003/0138284 A1 * | 7/2003 | Burden et al. | 401/194 |

OTHER PUBLICATIONS http://www.studentsupply.com, Calculators, 311 New Pen Calculator, visited October 27, 2005.

* cited by examiner

*Primary Examiner*—Alexander Eisen
*Assistant Examiner*—Matthew Yeung
(74) *Attorney, Agent, or Firm*—Chad D. Tillman; James D. Wright; Tillman Wright, PLLC

(57) ABSTRACT

A writing instrument for use by a grader comprises an elongate, tubular housing, a writing component secured within the housing and operative to make marks on a surface, and a calculation assembly comprised of electronic components. The calculation assembly is retained within the housing and includes a plurality of data entry devices for entering data used to calculate a grade, the data entry devices being accessible by the grader through an exterior surface of the housing; a processing device programmed to receive data from the plurality of data entry devices and calculate the grade based on the entered data by performing division; and a display component for displaying to the grader the grade calculated by the processing device. A method of grading comprises using the writing instrument.

4 Claims, 5 Drawing Sheets

WRITING INSTRUMENT THAT CALCULATES GRADE

I. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

II. BACKGROUND OF THE INVENTION

Grading a paper, assignment, or test (hereinafter generally referred to as "test") is an essential part of the duties and responsibilities of a teacher, professor, and/or teaching assistant. Many teachers spend a considerable amount of time grading tests. Accordingly, any tool enabling a teacher to grade tests more quickly and efficiently, without sacrificing grading quality, would be extremely desirable to teachers.

To that end, writing instruments that count and display the number of marks a teacher makes on a surface are generally known. Such instruments are available with both mechanical and electronic counting mechanisms. Further, these instruments generally provide a reset function whereby a teacher can reset the counter to zero upon completion of a particular student's test. Typically, a teacher uses one of these instruments to count the number of marks he or she makes on a particular student's test. The teacher can mark correct answers on a particular student's test, thereby creating a tally of correct answers with the writing instrument. Alternatively, the teacher can mark incorrect answers, thereby creating a tally of incorrect answers with the instrument. Using either method of tallying points, the teacher still is left with a raw number of either correct or incorrect answers. The teacher then has to calculate a grade using the raw number and the total number of points available on the test, which often is based on the number of questions and/or number of problems for the particular test. Such grade calculation for each student's test can add a significant amount of time to the overall grading process.

Accordingly, it would be advantageous to have a writing instrument that is able to calculate a grade for a student's test rather than simply tallying a number of points for correct or incorrect answers, as available writing instruments do.

III. SUMMARY OF THE INVENTION

The present invention includes many aspects and features. In a first aspect, a writing instrument for use by a grader comprises an elongate, tubular housing; a writing component secured within the housing and operative to make marks on a surface; and a calculation assembly comprised of electronic components. The calculation assembly is retained within the housing and includes a plurality of data entry devices for entering data used to calculate a grade, the data entry devices being accessible by the grader through an exterior surface of the housing; a processing device programmed to receive data from the plurality of data entry devices and calculate the grade based on the entered data by performing division; and a display component for displaying to the grader the grade calculated by the processing device.

In a feature of the first aspect, the calculated grade comprises a percentage representing the number of points received divided by the total number of points available. In another feature, the display component further displays to the grader the number of points received. In an additional feature, the display component further displays to the grader the number of points not received. In yet another feature, a particular one of the data entry devices is located proximate a tip end of the housing such that a grader holding the writing instrument in a hand for making a mark on a surface may actuate the particular one of the data entry devices with a finger of the hand.

In still yet another feature, the display component comprises an LCD display. In a further feature, the writing component comprises a replaceable ink cartridge. It is preferred that the writing component comprises a roller ball writing tip. In an additional feature, the writing component is retractable into a tip end of the housing. In accordance with this feature, the writing component is retracted into the housing by rotating the tip end of the housing. In another feature, the writing instrument further comprises a power/reset button. With regard to this feature, the power/reset button further provides reset functionality for the calculation assembly.

In a further feature, the plurality of data entry devices includes a point subtraction button. In accordance with this feature, the point subtraction button is disposed near a tip end of the housing. In yet another feature, the plurality of data entry devices includes a pair of programming buttons, one of the pair of programming buttons being a point increase button and the other of the pair of programming buttons being a point decrease button whereby a total number of available points may be programmed into the writing instrument. It is preferred that the pair of programming buttons are disposed near the display component.

In a still further feature, the processing device comprises a printed circuit board disposed in electronic communication with the plurality of data entry devices. In an additional feature, the processing device comprises a printed circuit board disposed in electronic communication with the display component. In another feature, the calculation assembly is battery powered. In yet another feature, the writing instrument further comprises a clip for attachment of the writing instrument to a shirt pocket. It is preferred that the clip is integrally formed with the housing.

In an additional feature, the housing includes a front portion and a back portion removably attached together. In accordance with this feature, the front portion is covered by a rubberized over-mold. With regard to this feature, the front portion and back portion are slidably detachable from one another.

In a second aspect, a method of grading comprises the steps of (a) providing a writing instrument for use by a grader, the writing instrument including a calculation assembly comprised of electronic components, the calculation assembly including, a user interface for entering data used to calculate a grade, a processing device programmed to receive data via the user interface and calculate the grade based on the received data by performing division, and a display component for displaying to the grader the grade calculated by the processing device; (b) programming, via the user interface, the writing instrument with a total number of points available for a particular test; (c) while grading the test, counting via the user interface the number of points lost for incorrect answers by actuating a switch for each point that is lost; and (d) viewing from the display component of the writing instrument a grade calculated by the writing instrument that is based on the number of points lost and the total number of available points.

In a feature of this aspect, steps (c) and (d) are repeated for tests of subsequent students. In accordance with this feature, the writing instrument includes a reset function so that the writing instrument may be reset between the tests of subsequent students. In another feature, the user interface includes a pair of programming buttons for entering the total number of available points. In an additional feature, the user interface includes a point subtraction button for entering the points to be subtracted. In yet another feature, the method further comprises turning the writing instrument on or off using a power button of the writing instrument.

In an additional feature, the processing device of the writing instrument comprises a circuit board disposed in electrical contact with the user interface. In another feature, the method further comprises adding back one or more points using the user interface, which points have been inadvertently subtracted while grading the test. In still another feature, the calculation assembly stores in nonvolatile memory the total number of points available. In a further feature, the incorrect answers include incomplete answers.

In addition to the aforementioned aspects and features of the present invention, it should be noted that the present invention further includes the various possible combinations of such aspects and features.

IV. BRIEF DESCRIPTION OF THE DRAWINGS

Further aspects, features, embodiments, and advantages of the present invention will become apparent from the following detailed description with reference to the drawings, wherein.

V. DETAILED DESCRIPTION

Figure 1:
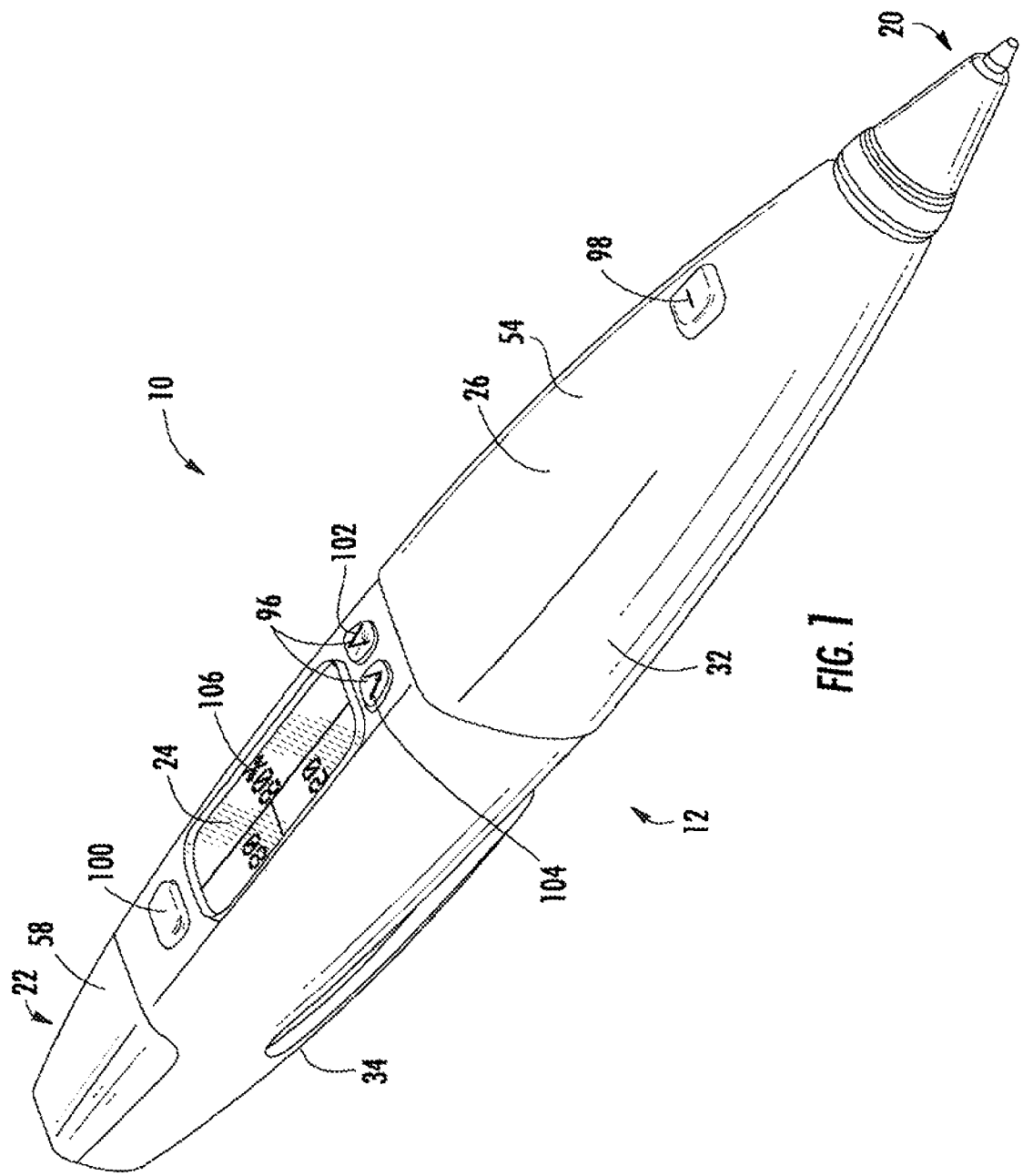
FIG. 1 is a perspective view of a grade calculating writing instrument in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Additionally, as used herein, "grade" is intended to refer to the percentage of points received out of a total of points available for a particular test or other graded assignment. The grade may or may not later be adjusted using a bell curve system or other system, as desired. Also, the term "grader" is intended to refer to a person grading the test or other assignment.

Referring now to the drawings, one or more preferred embodiments of the present invention are next described. The following description of one or more preferred embodiments is merely exemplary in nature and is in no way intended to limit the invention, its application, or uses.

Figure 2:
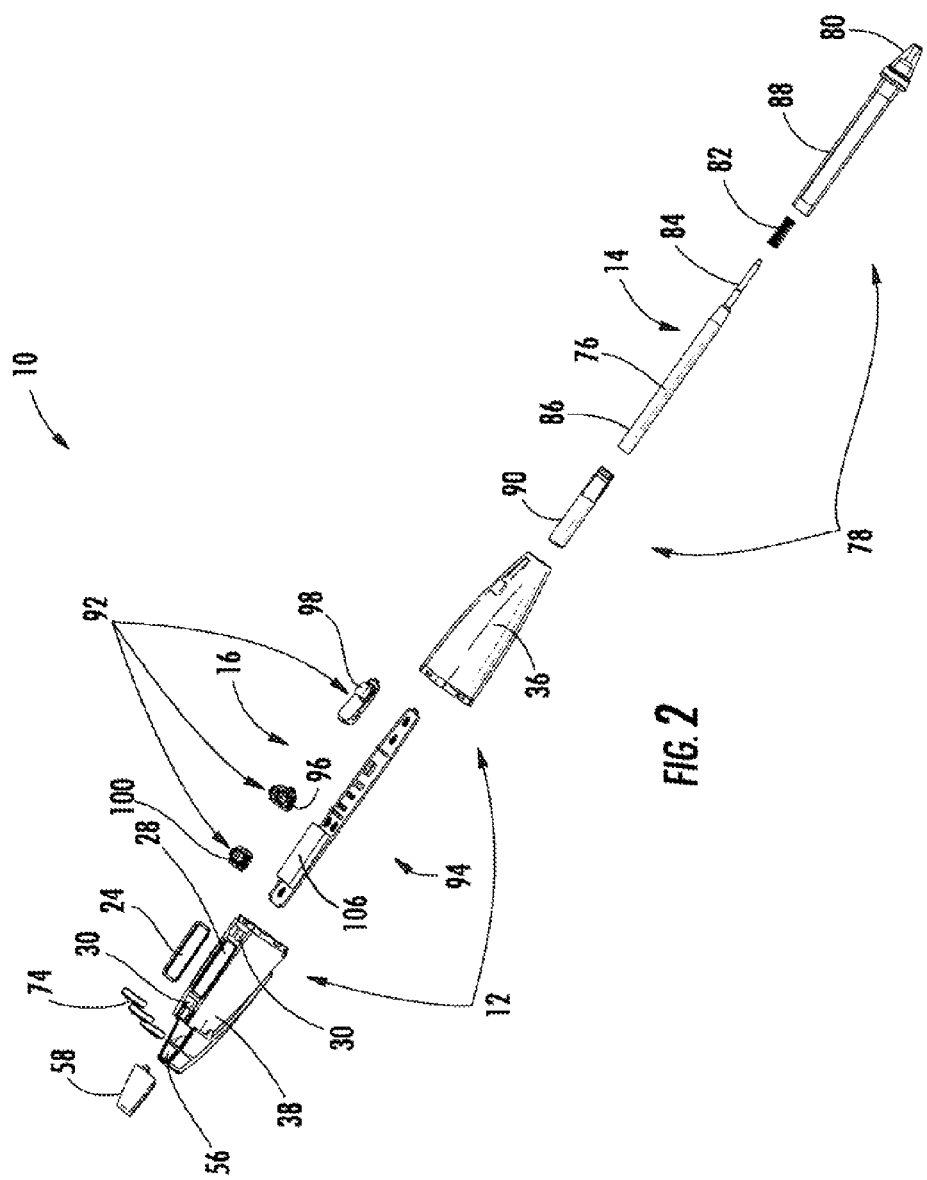
FIG. 2 is an exploded view of the writing instrument of FIG. 1.

FIG. 1 is a perspective view of a writing instrument 10 in accordance with a preferred embodiment of the present invention. FIG. 2 is an exploded view of the writing instrument 10 of FIG. 1.

As shown in FIG. 2, the writing instrument 10 comprises an elongate housing 12, a writing component 14 and a calculation assembly 16. The writing component 14 includes elements of the writing instrument 10 that enable it to make marks on a surface. The calculation assembly 16 includes elements that enable the writing instrument 10 to receive data and determine and display a grade as a function of the received data. The housing 12 generally encloses the writing component 14 and the calculation assembly 16. The housing 12 includes a tip end 20 and a display end 22, with the writing component 14 being at least partially disposed proximate the tip end 20 of the writing instrument 10. A display component 106, protected by a display window 24, is disposed proximate the display end 22 of the writing instrument 10. The display component 106, described below, is used to display grades calculated by the calculation assembly 16.

The housing 12 has a generally uniform triangular cross-section along its length, with the sides and corners thereof being somewhat rounded. This triangularly-shaped cross-section is perhaps best seen in FIG. 4, which is a perspective view of a front portion 36 of the housing 12, with the front portion 36 having been rotated such that an interior 40 of the housing 12 can be seen. However, the housing 12 tapers slightly at the display end 22 and tapers more substantially at the tip end 20. Along the length of the housing 12, the portion that would be considered the base of the triangular shape forms the top face 26 of the housing 12, and the portions that would be considered the sides of the triangular shape form the bottom faces 32 of the housing 12. As shown in FIG. 2, an opening 28 for receipt of the display window 24 and openings 30 for receipt of a plurality of data entry devices 92 are disposed in the top face 26 of the housing 12. The bottom faces 32 of the housing generally rest in a user's hand when he or she is using the writing instrument 10. The housing 12 further includes a clip 34 disposed near the display end 22, at the point where the bottom faces 32 of the housing 12 meet, i.e., the apex of the triangular shape. As shown, the clip 34 is integrally formed with the housing 12, but it will be evident that the clip 34 may alternatively be attached in a separate manufacturing step.

Figure 3:
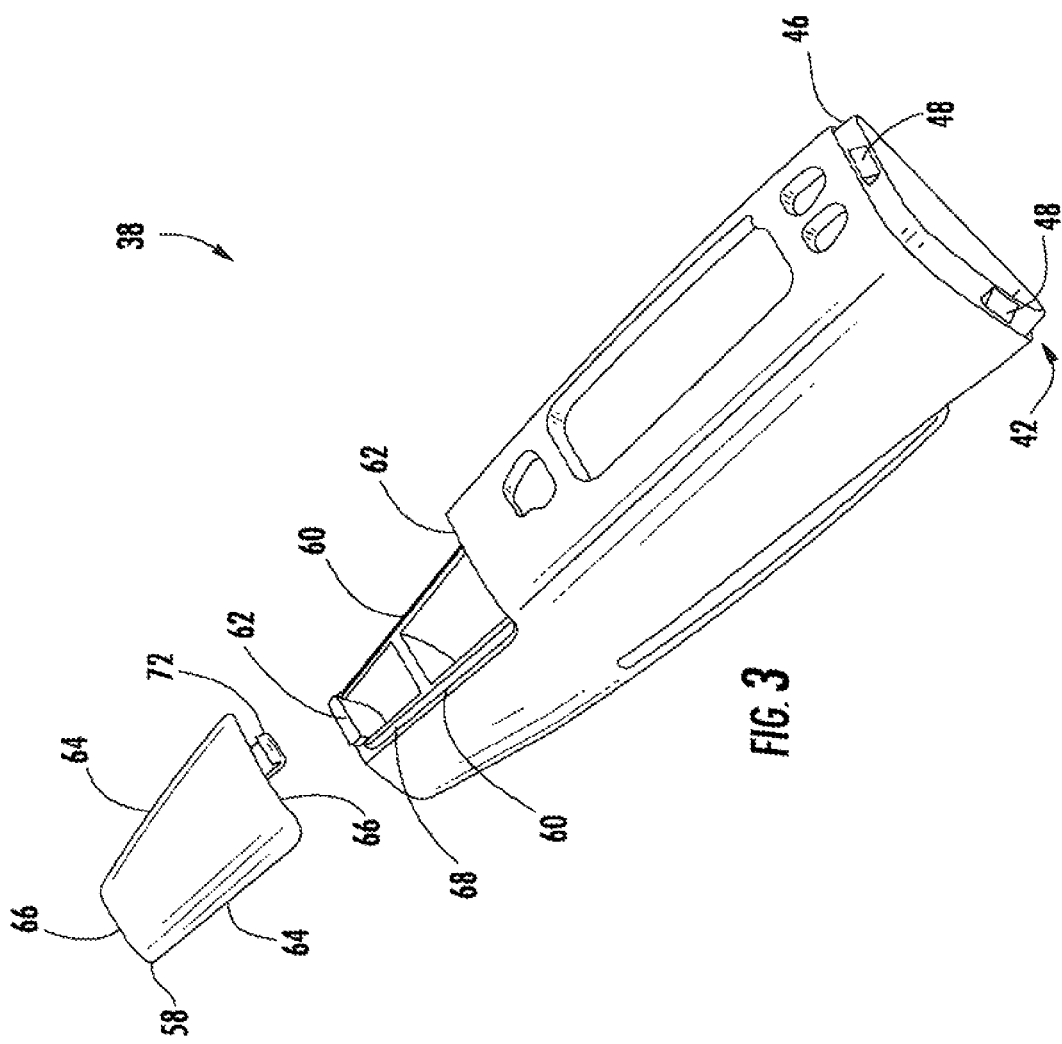
FIG. 3 is a perspective view of a back portion of the housing with a battery compartment cover detached.
Figure 4:
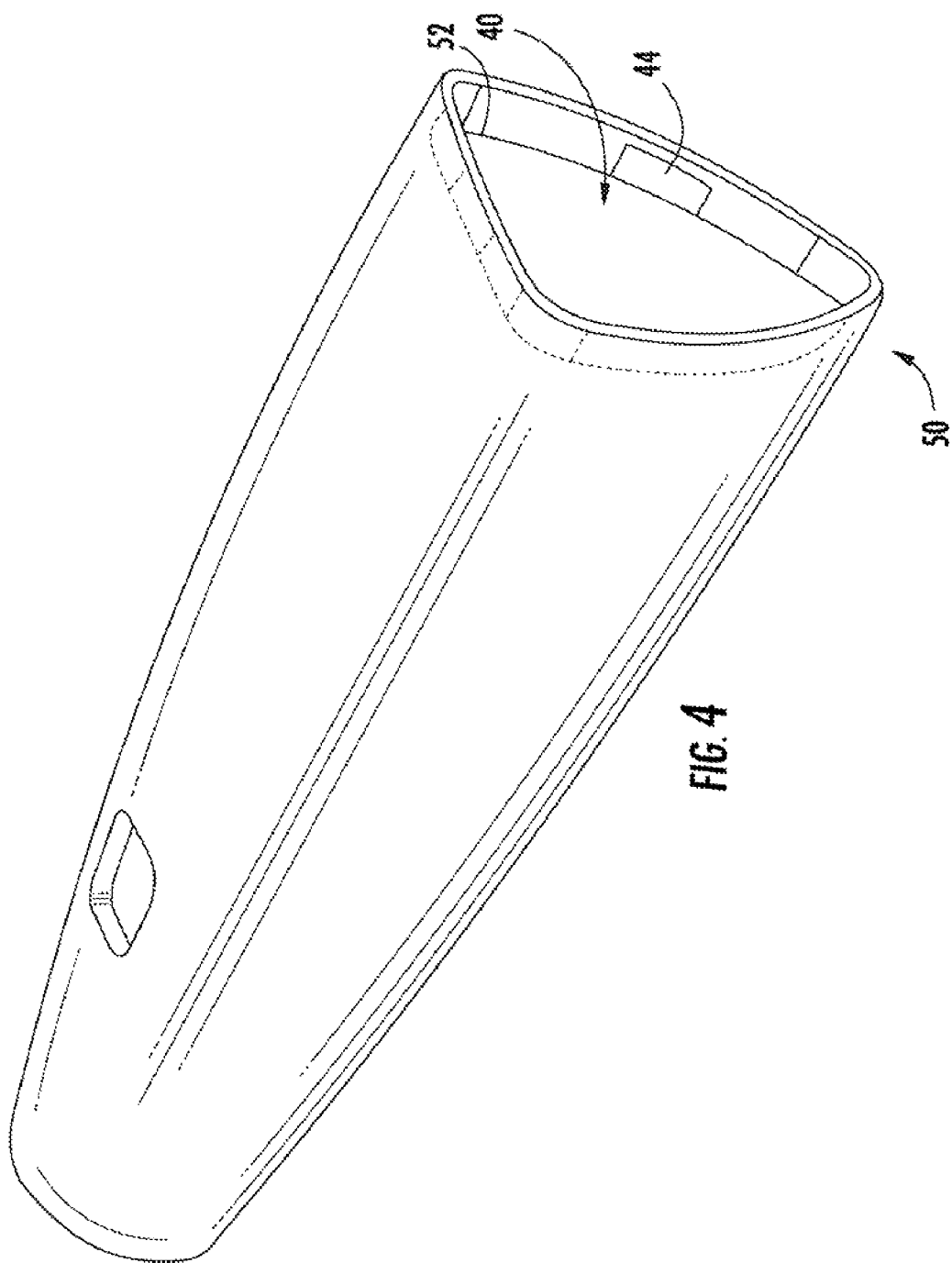
FIG. 4 is a perspective view of a front portion of the housing, with the front portion having been rotated such that an interior of the housing can be seen.

FIG. 3 is a perspective view of a back portion 38 of the housing 12 with a battery compartment cover 58 detached. With reference to FIGS. 3 and 4, the front portion 36 and back portion 38 may be detached from one another in order to access an interior 40 of the housing 12. In order to accomplish such detachment, the front portion 36 and back portion 38 have opposing facing ends 42,50 configured to have a slidable friction fit with one another. More particularly, the end 42 of the back portion 38 proximal the front portion 36 has an annular recess 46 there about. Three projections 48 extend slightly from the annular recess 46, one centrally disposed along each of the top and bottom faces 26,32 of the housing 12. The end 50 of the front portion 36 proximal the back portion 38 has a corresponding annular ledge 52 formed therein with three notched recesses 44 further formed there about, one centrally disposed along each of the top and bottom faces 26,32 of the housing 12. The annular recess 46 of the back portion 38 slides in a friction fit into the end 50 of the front portion 36 and rests against the annular ledge 52 of the front portion 36, with the projections 48 of the back portion 38 sliding into the notched recesses 44 of the front portion 36.

It is preferred that the front portion 36 have a rubberized over-mold 54. The over-mold 54 covers a point subtraction button 98, which is described in greater detail below, such that the button 98 is integral with the front portion 36 of the housing 12. The over-mold 54 allows a user to grasp the writing instrument 10 more securely, prevents debris from collecting around the point subtraction button 98, and provides a protective covering to the front portion 36. In a preferred embodiment of the housing 12, the housing 12, or portions thereof, are formed from one or more molding processes, such as injection molding, blow molding, or rotational molding processes. It is further preferred that the housing 12 be constructed of brightly colored material so that it will be readily identifiable by its owner and relatively easy to find if misplaced.

Although the present embodiment of the housing 12 is divided into a front and a back portion, it is contemplated that the housing 12 could be divided into a top and a bottom portion, which portions would be detachable from one another. In such an embodiment, the rubberized over-mold would cover the top portion of the writing instrument, including the point subtraction button.

Figure 5:
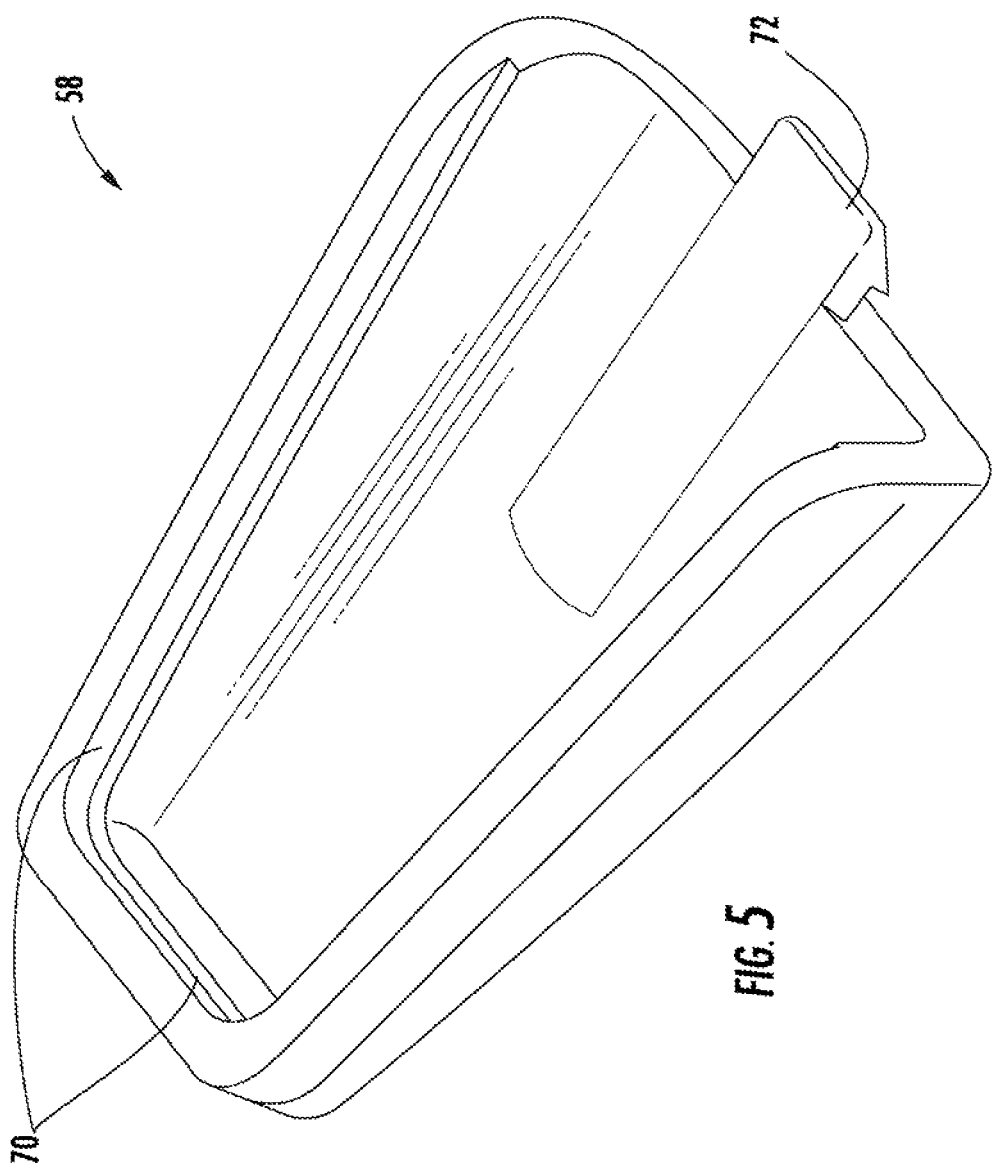
FIG. 5 is a back perspective view of a battery compartment cover.

As shown in FIG. 2, the housing 12 includes a battery compartment 56 and a corresponding cover 58 disposed adjacent the display end 22 of the housing 12. FIG. 5 is a back perspective view of the battery compartment cover 58. With reference to FIGS. 2, 3 and 5, the battery compartment 56 has opposing sides 60 and opposing ends 62, and the cover 58 has opposing sides 64 and opposing ends 66 that correspond to the sides 60 and ends 62 of the battery compartment 56. The battery compartment 56 has a tongue 68 around the edges of its sides 60 and the end 62 nearer the display end 22 of the writing instrument 10. The cover 58 has a corresponding groove 70 around the edges of its sides 64 and the end 66 nearer the display end 22 of the writing instrument 10. The tongue 68 of the battery compartment 56 fits in sliding relation with the groove 70 of the cover 58. The end 66 of the cover 58 not having the groove 70 includes a sloping projection 72 with a notch near the end thereof. When the cover 58 is slid over the compartment 56, the notched projection 72 catches on an underside of the top face 26 of the housing 12. The notched projection 72 and tongue-and-groove connection hold the cover 58 in place over the compartment 56. To remove the cover 58, a user simply applies a small amount of pressure near the interior end 66 of the cover 58 to release the notched projection 72 from the underside of the housing 12 and slides the cover 58 back. The battery compartment 56 is configured to receive and retain batteries 74 for supplying power to the calculation assembly 16 of the writing instrument 10.

With reference to FIG. 2, the writing component 14 includes an ink refill cartridge 76, a two-piece tubular casing 78, and a spring 82. The ink refill cartridge 76 may be a conventional, readily available ink refill cartridge having a writing end 84 and a storage end 86. It is contemplated that the ink cartridge 76 may be any of the available types of ink cartridges. Examples include roller ball, ball-point, and gel type cartridges. More particularly, it is preferred that the ink cartridge 76 be of the roller ball type. The spring 82 is also a conventional spring 82 for use in writing instruments. When the writing component 14 is assembled, the spring 82 is positioned over the writing tip 84 of the ink cartridge 76. The spring 82 aids in moving the writing component 14 between a retracted position and a protracted position. When the writing component 14 is in a protracted position, it can be used for writing. In contrast, when it is in a retracted position, it cannot be used for writing.

The tubular casing 78 of the writing component 14 has two portions, a tip portion 88 and a retraction portion 90 that are slidably connected to one another. The tip portion 88 includes a funnel-shaped tip 80 at an end thereof. When the writing component 14 is assembled, the ink cartridge 76, with the spring 82 positioned thereon, is disposed inside the tubular casing 78, with the writing end 84 of the ink cartridge 76 being aligned within the funnel-shaped tip 80 of the tubular casing 78. The funnel-shaped tip 80 may be rotated in the clockwise and counterclockwise directions to alternate the writing component 14 between the retracted and the protracted positions.

When the writing component 14 is in the retracted position, the ink cartridge 76 is retracted inside the casing 78 with the writing end 84 of the ink cartridge 76 being inside the funnel-shaped tip 80 of the casing 78. When the writing component 14 is in the protracted position, the writing end 84 of the ink cartridge 76 extends from the funnel-shaped tip 80 so that a person using the writing instrument 10 can write with it. To alternate between retracted and protracted positions, a user simply rotates the funnel-shaped tip 80 in the clockwise direction to protract the writing end 84 and in the counter-clockwise direction to retract the writing end 84. In a contemplated alternative preferred embodiment, a push button retraction mechanism, which may be of conventional design and construction, may be used to retract and protract the ink cartridge 76 of the writing instrument 10, as opposed to the rotating tip described above.

The calculation assembly 16 includes a plurality of data entry devices 92 and a processing device 94 for receiving data from the plurality of data entry devices 92, calculating a grade using entered data, and providing the calculated grade to the display window 24. The plurality of data entry devices 92 includes a pair of programming buttons 96 disposed near the display window 24 and a point subtraction button 98 disposed near the tip end 20 of the writing instrument 10. The plurality of data entry devices 92 further includes a power/reset button 100. The pair of programming buttons 96 is used to enter a total number of available points for a particular test. One button 102 is labeled with an up arrow and is used to increase the available point total. The other button 104 is labeled with a down arrow and is used to decrease the available point total. The programming buttons 96 accumulate or subtract points in one point increments. If either button 102,104 is held down for longer than a short period of time, the points are added or subtracted more quickly than if the button 102,104 was pressed repeatedly. Accordingly, points can be added or subtracted relatively quickly by simply holding down either button 102,104. It is contemplated that either of the pair of programming buttons 96 can have dual functionality. It is preferred that the button 102 used to increase the point total have dual functionality, which is described below. The programming buttons 96 are disposed near the display window 24 to provide easy viewing of the display window 24 as the writing instrument 10 is being programmed with the amount of available points for a particular test.

The point subtraction button 98 is labeled with a minus sign and is used to reflect points to be subtracted for an incorrect answer, i.e., a person using the writing instrument 10 depresses the point subtraction button 98 to indicate that a point is to be subtracted from the total number of available points. The point subtraction button 98 subtracts points in one point increments. For example, if a particular question is worth three points and the grader wants to count off full credit for missing the question, the grader will press the button 98 three times. If the grader wants to count off partial credit for partially missing the question, the grader will press the button 98 one or two times, depending on the amount of partial credit he or she wants to give. The point subtraction button 98 is disposed near the tip end 20 of the writing instrument 10 to provide easy access thereto and use thereof while a test is being graded. A person using the writing instrument 10 may depress the point subtraction button 98 while holding the writing instrument 10 just as a pen or pencil is conventionally held. Accordingly, a grader using the writing instrument 10 does not have to adjust his or her grip on the writing instrument 10 to write with the instrument or to subtract points using the point subtraction button 98.

The power/reset button 100 is used to turn the writing instrument on and off. The button 100 is also used to reset the number of points to be subtracted from the total number of available points to zero, i.e., the number of points to be subtracted is reset to zero thereby returning the number of available points (the maximum score) to its initial and complete value. The power/reset button 100 is disposed near the display end 22 of the writing instrument 10 so that it is easily accessed prior to using the writing instrument 10 but is out of way while the writing instrument 10 is being used for grading. Accordingly, this arrangement minimizes the possibility of the power/reset button 100 being inadvertently pressed while a test is being graded.

The processing device 94 in the present embodiment is preferably a microprocessor- or microcontroller-based collection of control logic, arranged on a printed circuit board, the design and implementation of which in accordance with the following functional description will be evident to the Ordinary Artisan. The processing device 94 is designed to receive input data from the data entry devices 92, calculate a grade based on the data input, and display the calculated grade in the display window 24. The processing device 94 is designed with a series of switches to receive input from the data entry devices 92, e.g., the pair of programming buttons 96, the point subtraction button 98 and the power/reset button 100, and perform a particular action depending on the received data. Each data entry device 92 is associated with a particular switch, which is responsible for action associated with the particular data entry device. Further, the switches may be designed to take more than one action depending on the length of time that a data entry device 92 is depressed. For example, for the power/reset button 100, depressing the button briefly after the writing instrument 10 has been turned on will activate the reset button. Whereas, pressing the button 100 for a longer amount of time will turn the writing instrument 10 off.

Each switch includes a pair of contacts, one on the circuit board and one on the data entry device. When a particular data entry device 92 is depressed, the contacts for the particular switch connect to make a circuit thereby activating the associated switch. The processing device 94 then performs the action dictated by the switch that is activated. When pressure is removed from the particular data entry device 92, the circuit for the associated switch is broken. For example, when the power/reset button 100 is initially depressed, the contact for the power/reset button 100 connects with the contact on the processing device 94 for the power/reset switch and the writing instrument 10 is turned on.

The processing device 94 is programmed to store the total number of available points, which are entered using the pair of programming buttons 96, and to calculate a grade using the total number of available points and the points to be subtracted, which are entered using the point subtraction button 98. The total number of available points for a particular test represents a score that is 100% correct for that test, i.e., a grade of 100. Each point that is subtracted from the total number of available points represents a score that is less than 100%. Each time the point subtraction button 98 is depressed, the processing device 94 calculates a new percentage correct or a new grade.

As stated previously, the calculation assembly 16 further includes a display component 106 that shows the calculated grade through the display window 24. In at least one embodiment, the display component 106 is a liquid crystal display ("LCD"), but it will be evident to the Ordinary Artisan that other types of display technologies, such as light emitting diodes, may alternatively be used without departing from the scope of the present invention. Each time the point subtraction button 98 is depressed, the processing device 94 calculates a new grade and the display component 106 displays the most recently calculated grade. In addition to the percentage correct, the display component 106 also shows the number of points subtracted, i.e., the number of times the point subtraction button has been depressed, and the number of points remaining. The number of points subtracted generally represents the number of wrong answers or the number of questions that have been missed. However, as described previously, the writing instrument enables a grader to give partial credit for a question that is partially correct by allowing the grader to select the number of points subtracted for each question. The grader may subtract full credit for a question or may only subtract a portion of the available points for a particular question. The number of points remaining generally represents the number of correct answers or the number of questions that were answered correctly. As the person is grading a test or other assignment, the display component 106 displays the percentage correct, the number of points remaining and the number of points subtracted. After the grader has completed his or her review of a student's test, the grader may obtain the student's grade, the number of points earned, and the number of points subtracted from the display component 106. This allows a grader to provide a student with his or her grade, as well as, the number of points the student scored and the number of points the student missed.

To further explain the operation of the writing instrument 10, an exemplary test having a total number of 100 available points will be considered. The grader using the writing instrument 10 turns it on by pressing the power/reset button 100. Once the writing instrument 10 has been turned on, the grader presses the programming button 102 having an up arrow shown thereon until the display component 106 shows the number 100. The grader can press and hold the up arrow button 102 until the LCD reaches 100. If the grader accidentally holds the up arrow button 102 down for too long, the grader can press the down arrow button 104 to make the number go back down to 100. The grader can press and hold the down arrow button 104 to decrease the point total quickly or can press the down arrow button once for each point that is desired to be decreased. Once the desired point total is input, the grader has completed programming the writing instrument 10.

The grader may then begin to review a test for a particular student. To access the writing component 14, the grader simply rotates the pen tip 80 clockwise. To retract the writing component 14, the grader rotates the pen tip 80 counter clockwise. It is contemplated that a grader will wish to have access to the writing component 14 during grading so that he or she may mark on the student's test to signify questions that are incorrect or provide notes or comments to the student.

The grader holds the writing instrument 10 as writing instruments are conventionally held. As such, the point subtraction button 98 is readily accessible by the grader as the test is being graded. When the grader encounters an answer to a question that is incorrect, the grader depresses the point subtraction button 98 for each point that is desired to be subtracted. For example, if a particular question is worth five points and the student has completely missed the question, the grader will depress the point subtraction button 98 five times to subtract five points from the total number of available points. If the student's answer is partially correct, the grader may wish to count off three points for the question. As such, the grader presses the point subtraction button 98 three times to subtract three points from the total number of available points. In either instance, the writing instrument 10 calculates the percentage correct after the point subtraction button has been depressed and displays the percentage correct in the display window 24. If the grader accidentally subtracts more points than what is intended, then the grader simply presses the up arrow button 102 to add the desired number of points back to the point total. (This ability to add back the points subtracted represents the dual functionality of the button 102.)

The grader continues to grade the test, subtracting points along the way for incorrect answers. Once a student's test has been completely reviewed, the grader simply looks at the display component 106 readout, visible through the display window 24, to get the student's grade. The display component 106 will show the percentage correct (i.e., the grade), the number of points received for correct answers, and the number of points lost for incorrect answers. In this example, the student has a grade of 80% representing 80 points correct and 20 points lost. The points received and the points lost will sum to the total number of points that were available to the student. This provides an easy check for the grader using the writing instrument 10. The grader may then adjust and/or record the student's grade in any manner that is desired.

Once the grader wishes to move to another student's test, the grader presses the power/reset button 100 to reset the points subtracted to zero. The writing instrument 10 remains programmed with the total number of available points and the instrument 10 is ready for grading of another student's test. The grader is efficiently able to grade the tests for an entire class of students in this manner.

Further, it is contemplated that the writing instrument 10 will store and recall the last used total number of available points even after the writing instrument 10 has been turned off and then back on. If the grader wishes to continue grading using the available point total, he may do so. If not, he may reprogram the instrument 10. For example, imagine that a grader is interrupted during a grading session and must stop the grading process. The grader turns the instrument 10 off by depressing the power/reset button 100 until the instrument 10 turns off. When the grader is ready to grade the same group of tests again, he or she simply presses the power/reset button 100 to turn the instrument 10 on. The total number of available points for the last test being graded is still stored in the instrument 10. If the grader wishes to grade more tests, he or she may begin with a student's test by pressing the point subtraction button 98 for points missed.

If the grader wishes to grade a different test, he or she presses the up arrow 102 and down arrow buttons 104 to enter the total number of available points for the different test. Once the grader has entered the new point total, he or she may begin using the point subtraction button 98 to subtract points from the total. Use of the instrument 10 continues as described above for subsequent students' tests.

The writing instrument 10 of the present invention is advantageous because it is able to calculate a grade for a student's test rather than just tallying a number of correct or incorrect answers, as available writing instruments do. A grader can use the writing instrument 10 to review a student's test and receive the grade for the test at the end of the review rather than having to hand calculate the grade after the review. Further, unlike available writing instruments, a grader may use the writing instrument 10 to provide comments on a student's test without the writing instrument automatically subtracting points from the student's point tally. The writing instrument 10 is easy to use and provides assistance in making the grading process faster and more efficient.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. For example, although the present invention has been described as utilizing the functionality, and including the components, of a writing pen, it will be evident that the present invention may likewise be implemented using writing pencil functionality and components.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for facilitating grading, comprising
   (a) receiving, at a writing instrument, an identification of a total number of available points input using one or more data entry devices of the writing instrument;
   (b) thereafter,
      (i) receiving, at the writing instrument, a first set of one or more indications, input using one or more data entry devices of the writing instrument, to subtract a point,
      (ii) calculating, via a processing device of the writing instrument after each indication to subtract a point of the first set of one or more indications is received, a grade using division based on the identified total number of available points and the number of indications of the first set of one or more indications, and
      (iii) displaying, after each calculation following receipt of an indication to subtract a point of the first set of one or more indications, the grade calculated by that calculation;
   (c) thereafter, receiving, at the writing instrument, an indication to reset input using one or more data entry devices of the writing instrument;
   (d) after receiving the indication to reset,
      (i) receiving, at the writing instrument, a second set of one or more indications, input using one or more data entry devices of the writing instrument, to subtract a point, and
      (ii) calculating, via a processing device of the writing instrument after each indication to subtract a point of the second set of one or more indications is received, a grade using division based on the identified total number of available points and the number of indications of the second set of one or more indications, and
      (iii) displaying, after each calculation following receipt of an indication to subtract a point of the second set of one or more indications, the grade calculated by that calculation.

2. A writing instrument for use by a grader, comprising:
   (a) an elongate, tubular housing;
   (b) a writing component secured within the housing and operative to make marks on a surface; and
   (c) a calculation assembly comprised of electronic components, the calculation assembly being retained within the housing and including,
      (i) a plurality of data entry devices for entering data used to calculate a grade, the data entry devices being accessible by the grader through an exterior surface of the housing,
      (ii) a processing device programmed to receive data from the plurality of data entry devices and calculate the grade based on the entered data by performing division, and
      (iii) a display component for displaying to the grader the grade calculated by the processing device;
   (d) wherein the calculation assembly is configured to allow a grader to identify, via one or more of the plurality of data entry devices, a total number of available points;
   (e) wherein a particular one of the data entry devices is a point subtraction device, and the calculation assembly is configured to allow a grader to indicate, via actuation of the point subtraction device, that a point should be subtracted;
   (f) wherein the point subtraction device is located proximate a tip end of the housing, and the writing instrument is configured to allow a grader holding the writing instrument in a hand to both
      (i) write with the instrument, and
      (ii) actuate the point subtraction device
      without adjusting his or her grip on the writing instrument; and
   (g) wherein the calculation assembly is configured to display, via the display component, a grade calculated based on the identified total number of available points, and the indicated number of subtracted points.

3. The writing instrument of claim 2, wherein the point subtraction device is located proximate a tip end of the housing such that a grader holding the writing instrument in a hand for making a mark on a surface can actuate the point subtraction device with a finger of that hand.

4. The writing instrument of claim 2, wherein at least one of the data entry devices is configured to allow a grader to add back a point that was previously subtracted.

* * * * *